Aug. 27, 1940.   H. McADAMS   2,213,144
ELASTIC TOP STOCKING AND METHOD FOR PRODUCING SAME
Filed Oct. 6, 1938   7 Sheets-Sheet 1

FIG. 1.

INVENTOR.
Harry McAdams

Aug. 27, 1940.   H. McADAMS   2,213,144
ELASTIC TOP STOCKING AND METHOD FOR PRODUCING SAME
Filed Oct. 6, 1938   7 Sheets-Sheet 3

FIG. 4.

INVENTOR.
Harry McAdams

BY Lancaster, Alvise and Rommel
ATTORNEYS.

Aug. 27, 1940.   H. McADAMS   2,213,144
ELASTIC TOP STOCKING AND METHOD FOR PRODUCING SAME
Filed Oct. 6, 1938   7 Sheets-Sheet 4

INVENTOR.
Harry McAdams
BY Lancaster Allwine Rommel
ATTORNEYS.

Aug. 27, 1940.   H. McADAMS   2,213,144
ELASTIC TOP STOCKING AND METHOD FOR PRODUCING SAME
Filed Oct. 6, 1938   7 Sheets-Sheet 5

INVENTOR.
Harry McAdams
BY Lancaster, Allwine and Rommel
ATTORNEYS.

Aug. 27, 1940. H. McADAMS 2,213,144
ELASTIC TOP STOCKING AND METHOD FOR PRODUCING SAME
Filed Oct. 6, 1938  7 Sheets-Sheet 6

Aug. 27, 1940.  H. McADAMS  2,213,144
ELASTIC TOP STOCKING AND METHOD FOR PRODUCING SAME
Filed Oct. 6, 1938  7 Sheets-Sheet 7

INVENTOR.
Harry McAdams
ATTORNEYS.

Patented Aug. 27, 1940

2,213,144

UNITED STATES PATENT OFFICE 2,213,144

ELASTIC TOP STOCKING AND METHOD FOR PRODUCING SAME

Harry McAdams, Reading, Pa., assignor to The Nolde and Horst Company, Reading, Pa., a corporation Application October 6, 1938, Serial No. 233,636

10 Claims. (Cl. 66—172)

This invention relates to improvements in elastic top stockings.

The primary object of this invention is the provision of an improved stocking with an elastic top which will permit of efficient and comfortable positioning upon the leg of a wearer, and which gives a good appearance from both a merchandising standpoint and from the standpoint of fashion.

Other objects and advantages of this invention will be apparent during the course of the following detailed description.

In the accompanying drawings, forming a part of this specification, and wherein similar reference characters designate corresponding parts throughout the several views.

Figures 12, 13, 14:
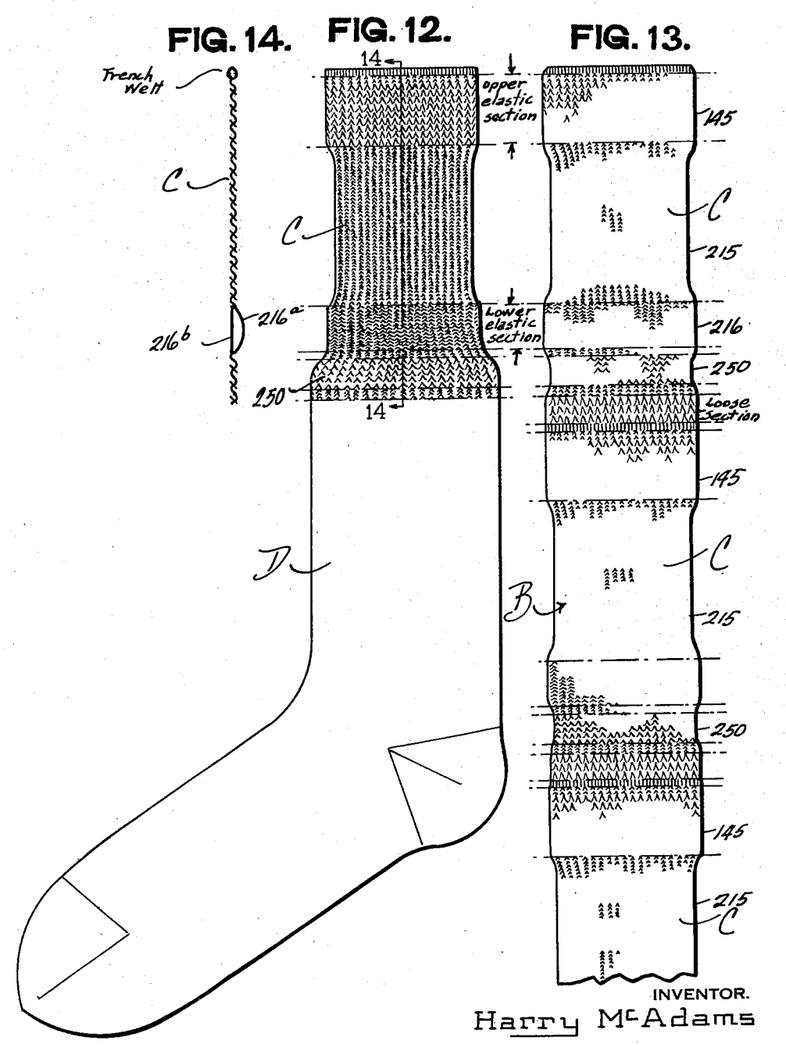
Figure 12 is a side view of the improved stocking, the top of which is knitted on the improved machine shown in Figures 1 to 11 inclusive.
Figure 13 is a side elevation of the fabric knitted upon the machine shown in Figures 1 to 11; showing the tops connected together in stringwork.
Figure 14 is a sectional view taken substantially on the line 14—14 thru one side of the top shown in Figure. 12.

In the drawings, wherein for the purpose of illustration is shown a preferred embodiment of a machine for knitting the improved top and wherein is shown the improved stocking and the fabric of the top thereof, the letter A may generally designate the improved machine, which, as above mentioned, is preferably of the Wildman type, and whereon is knitted the string-work fabric shown at B in Figure 13 of the drawings, consisting of a plurality of connected tops C. The improved stocking D shown in Figure 12 is formed by the usual method of transferring a top C to the needles of a knitting machine and thereafter knitting the leg portion and foot portion.

Referring to the machine A (Figure 1), the same includes a frame or bed 20 having a stationary cylinder 21 secured thereto wherein a set of needles 23 are positioned in the usual manner. A cylinder cam ring 24 is rotatably supported on the bed of the machine and has a bevel gear 25 keyed therewith; the latter being rotatably driven in a manner well known in this art. A suitable yoke 26 mounted on the frame 20 supports a fixed ring 27 on the top thereof, wherein is rotatably supported a dial supporting member 28. This rotatable member supports a dial post 29. It is stationary and has a dial bed 33 secured therewith over the cylinder, wherein a set of dial needles 34 are slidably positioned in the usual manner. A dial cam carrier or cap 35 is rotatably supported above the dial cap and connected by means of a link and post mechanism 36 with the cylinder cam ring 24, for rotation therewith. Above the rotary member 28 a bobbin stand 40 is supported, whereon suitable yarn bobbins 41 are provided, the yarns of which extend through a passageway in the rotatable member 28 to the various yarn fingers of the several yarn feeds provided on the machine, as will be subsequently described.

The improved machine is equipped with two yarn feed stations. At one of these stations which we will suitably designate as E, there are provided two feed fingers 45 and 46ª, adapted to feed two inelastic yarns and one elastic yarn to the needles of the knitting machine; the feed finger 45 feeding an inelastic yarn 46 to the needles and the feed finger 46ª being equipped with two feed openings, the forward one of which feeds a light inelastic yarn 49 to the needles and the rear opening of which feed finger 46ª feeds an elastic yarn 50 the same needles which receive the light inelastic yarn 49.

Figure 2:
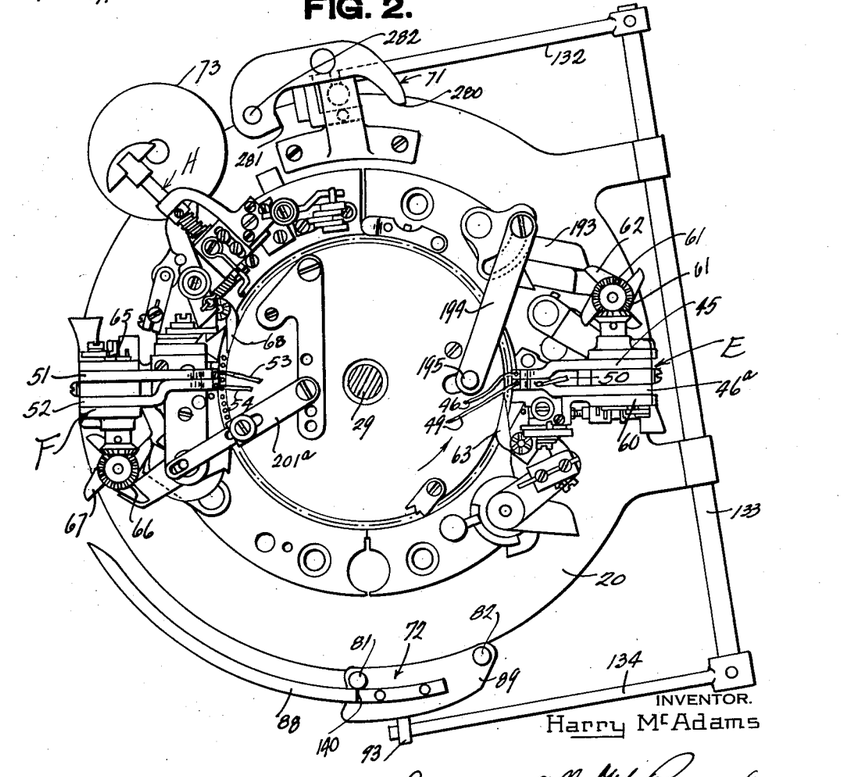
Figure 2 is a plan view of the knitting machine above the dial, showing more particularly the different yarn feeds and the pattern controlled mechanism for operating the dial and cylinder needle actuating cams.

At the second feed, generally designated at F in Figure 2 of the drawings, where are provided two feed fingers 51 and 52 adapted to feed elastic and inelastic yarns respectively to the needles of the machine; the finger 51 controlling the feed of an elastic yarn 53 to the needles of the machine, and the finger 52 controlling the feed of an inelastic yarn 54 to the needles.

The feed fingers 45, 46ª, 51 and 52 are actuated in the manner usual to the Wildman topping machine. Thus, at feed E the fingers 45 and 45ª are pivotally supported upon a bracket 60 and are individually actuated through suitable bevel gearing 61 and a star wheel 62. The mechanism associated with this feed also operates a binder and cutter 63 in the usual manner, well known to those skilled in the art, and which need not be explained in the specification.

At the feed F the fingers 51 and 52 are likewise supported upon a standard 65 and actuated through bevel gearing 66 and a star wheel 67. This feed also has a binder and cutter 68 which is actuated through turning of the shaft supporting one of the bevel gears of the feed.

Figures 8, 9, 10, 11:
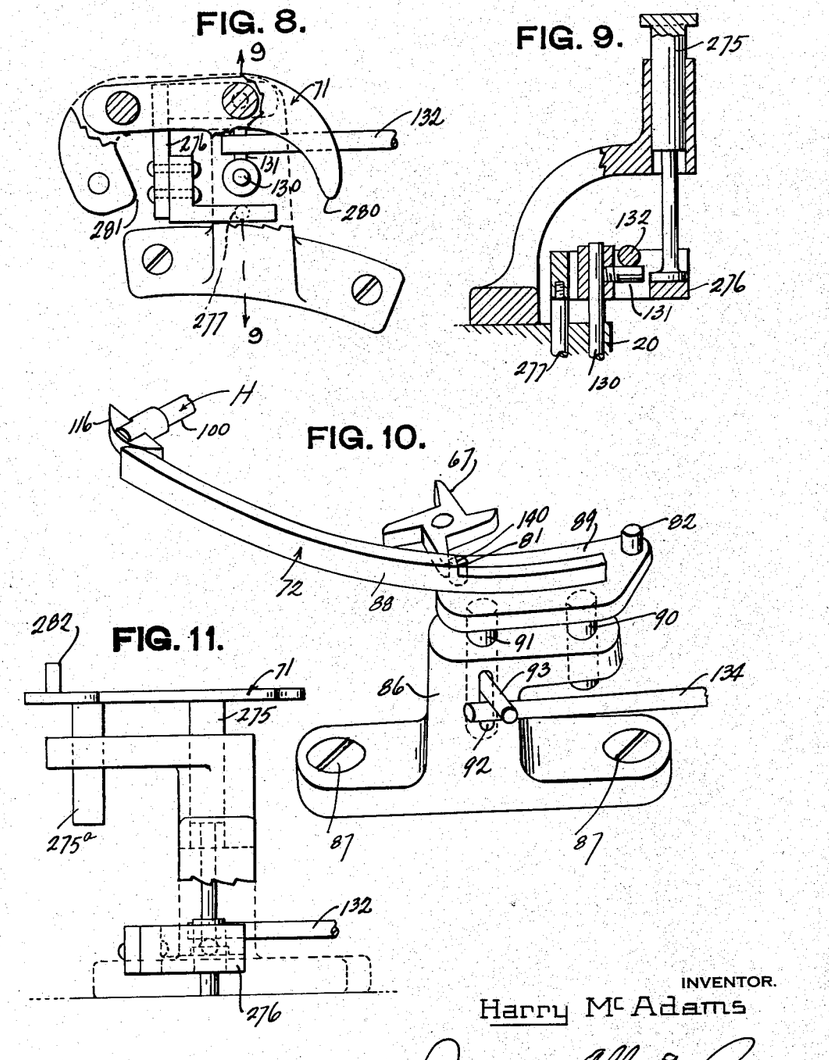
Figure 8 is a plan view, partly in section, showing means for operating various feed finger and yarn controlling elements of the machine.
Figure 9 is a sectional view taken substantially on the line 9—9 of Figure 8.
Figure 10 is a perspective view showing pattern controlled means for operating various yarn feed finger and yarn controlling devices.
Figure 11 is an elevational view, partly broken away, of the mechanism shown in Figure 8.

The star wheel 62 which controls the feed fingers and binding and cutting mechanism of the feed E is actuated off a pattern controlled member 71, shown in Figure 2 of the drawings and detailed in Figures 8, 9 and 11 of the drawings, and wheel 67 is actuated off of a device 72 shown in Figure 2 of the drawings and also in perspective in Figure 10 of the drawings. These devices 71 and 72 are elevated and lowered by suitable pattern mechanism associated with the Wildman type of machine. The cams and other controls for the cylinder needles are actuated off of a member 73, shown in Figure 2 of the drawings which is elevated and lowered, in accordance with the usual Wildman machine, by suitable pattern mechanism. Such pattern mechanism is generally set forth in U. S. Patent 805,612, and need not be further detailed in this application.

The yarn feed fingers at feed E are controlled by the device 71. It is supported for vertical movement on shafts 275 and 275ª. A vertically movable U-shaped frame 276 is attached to a pattern controlled slide stem 277. The yarn feed finger control member 71 has points 280 and 281 which engage the star wheel 62 at the feed E in order to throw the yarn feed fingers 45 and 46 in and out of action. Pin 282 operates the binder and cutter.

It is thought best to describe the other details of the machine in connection with the cycle of knitting one of the improved stocking tops C, as follows:

The stocking top C is knitted on the machine starting at the welt of the stocking. The welt is preferably of the French type. The inside web of the welt is knitted on the dial needles 34, using the inelastic yarn 54 which is fed off of the feed finger 52. The outside web of the French welt is knitted on the cylinder needles 23, using the inelastic yarn 46 which is fed from the finger 45 at the other feed of the machine. Of course this welt is only one or two courses, as shown at the top portion of Figure 15 of the drawings.

Figures 15, 16:
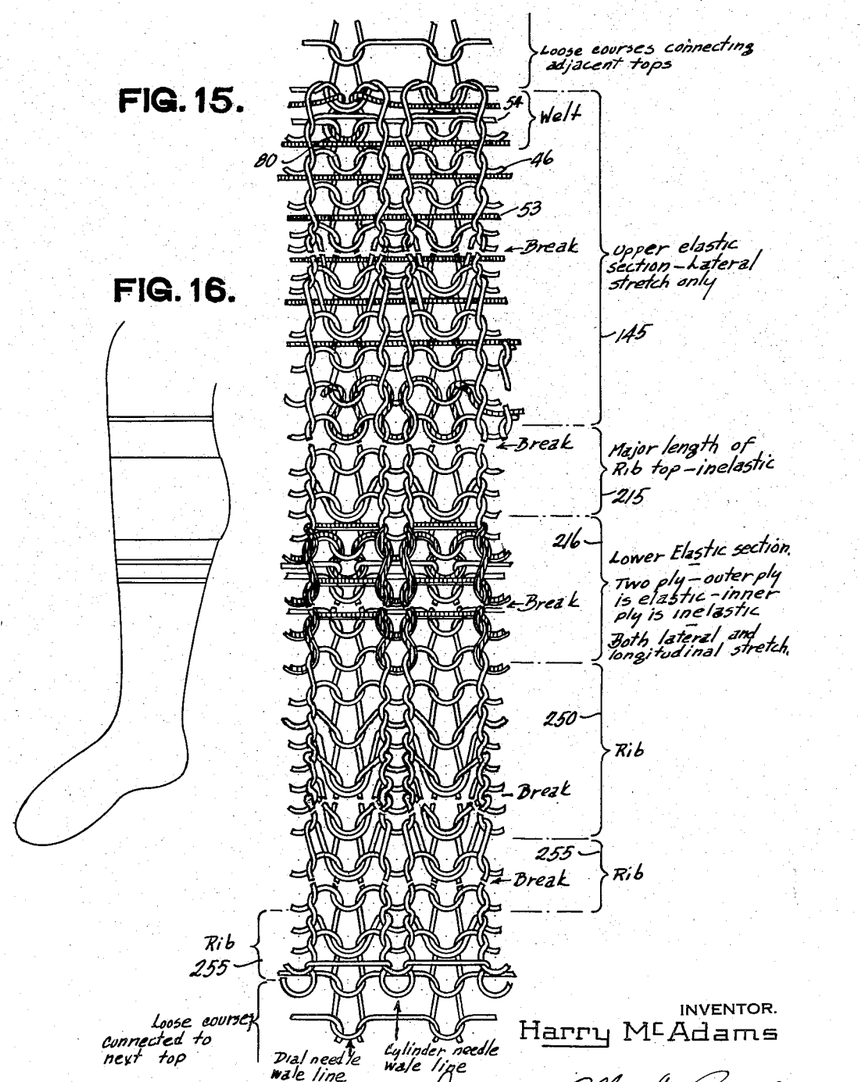
Figure 15 is an enlarged fragmentary view showing the different knitted portions of the top.
Figure 16 is a side view, showing the manner in which the stocking fits upon the leg of a wearer.

At the upper elastic section the elastic yarn 53 is laid in between the dial and cylinder stitches; forwardly of the dial stitches and at the inside of the cylinder stitches. This elastic yarn 53 is moved into position by its feed finger 51 either during the knitting of the French welt or immediately thereafter. In Figure 15 the elastic yarn 53 is shown knitted in at 80 to one or more stitches of the inelastic yarns; preferably with the yarn 54 as it is fed to the dial needles during the knitting of the French welt. The feed finger 51 is knocked down into feed position at feed F by means of rotation of the star wheel 67; this star wheel hitting a pin 81 on the yarn feed control device 72, shown in Figures 2 and 10 of the drawings in order to be lowered into place. As before mentioned this elastic yarn 53 is knitted in the fabric on one or two needles, and then the star wheel 67 hits the pin 82, as the cylinder cam ring rotates, and this knocks the feed finger 51 up to an inoperative position. However, before this takes place a plunger-like device H, shown in Figures 2, 5, 6 and 7 of the drawings, operates to pull down the elastic yarn to the position shown in Figure 6 of the drawings so that it can be laid in between the dial and cylinder needle stitches; as shown in the upper portion of Figure 15 of the drawings, forwardly of the stitches in the dial needle wale lines and rearwardly of the stitches in the cylinder needle wale lines. This elastic yarn is thus laid in for any desired number of courses to form the upper elastic section shown in Figure 15 of the drawings, and at the end of the section it is again knitted into the stitches of the fabric, for anchoring purposes, inasmuch as the elastic yarn 53 is placed into the fabric under slight tension. This upper elastic section thus only has lateral stretch.

At this time the operation of the device H controlling the yarn 53 will be described.

Referring to Figures 2, 5 to 7, and 8 to 11 of the drawings wherein is more particularly illustrated the pattern control arrangement for regulating and controlling the various yarns, the device 72 shown best in Figure 10 of the drawings, includes a supporting post or frame 86 which is mounted at 87 on the stationary frame structure 20 of the machine. The device 72 further includes a yarn controlling arm 88 mounted on a movable base 89. The latter is provided with the depending pins 90 and 91 reciprocably supported for vertical movement in suitable sockets in the upper portion of the standard or post 86, as shown in Figure 10. The post is slotted at 92 and through it extends a pin 93 which is rigid with the pin 91. This pin 93 is adapted to be operated through suitable leverage mechanism so that the arm 88 and its base 89 may rise and fall for control actuation in a manner to be subsequently described. The pins 81 and 82, above described, are rigidly carried and extended upwardly from the base 89 and adapted to actuate the star wheel 67 in the manner above described. The arm 88 is adapted to actuate the plunger mechanism H, first for swinging it upward into position where it may grab the elastic yarn 53, and then to release it so that the plunger mechanism will hold the elastic yarn in normal feed position to the fabric being knitted.

Figure 5:
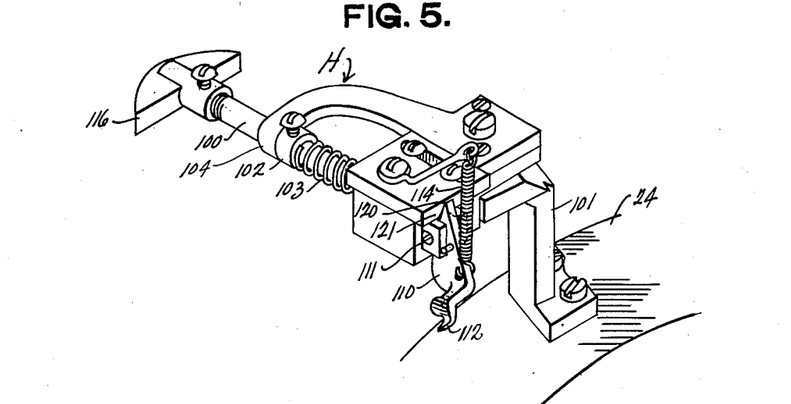
Figures 5, 6 and 7 are different views showing an elastic yarn controlling member which cooperates during the knitting of the top of the stocking in properly positioning the elastic yarn with respect to the cylinder and dial needles so that the yarn will be properly laid in with respect to the knitted stitches.
Figure 6:
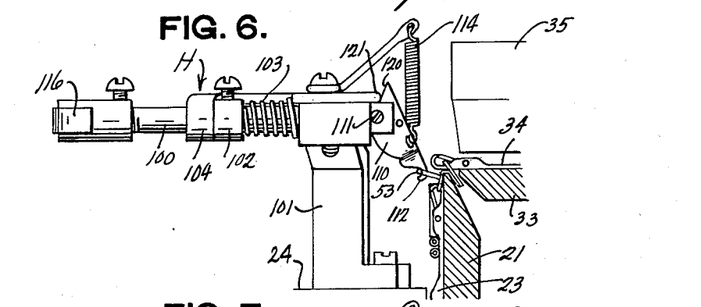
Figure 7:
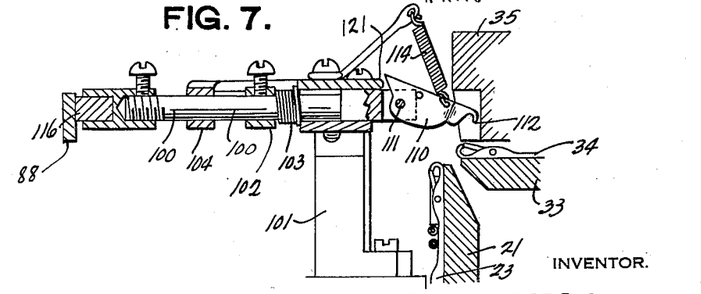

The plunger controlling device H, as more particularly detailed in Figures 5, 6, and 7 of the drawings, includes a horizontally positioned plunger shaft 100 supported on a suitable standard 101 which is attached to the cylinder cam ring 24 and rotates therewith. This shaft 100 is provided with a suitable collar 102, intermediate its ends and a spring 103, under compression, and positioned between this collar 102 and the portion of the standard 101, normally urging the shaft 100 radially outward from the cylinder; the limit of movement being determined by a stop arm 104, which is part of the standard 101. The forward end of the shaft 100 is provided with a yarn engaging finger or guide 110 pivoted at 111 thereto for vertical swinging. At its outer end it is provided with a hook 112, similar to a needle hook, which engages the elastic yarn and pulls it from a normally inoperative position, or needle knitting position, into the position shown in Figure 6 where it may feed into the fabric, in a laid in relation between the cylinder needle and dial needle wale stitches. A spring 114 normally pulls the yarn guide and restraining member 110 upwardly into the position shown in Figure 7 of the drawings, and it will assume this position when the plunger shaft 100 is pushed in to compress the spring 103, as occurs when the cam shaped segmental end 116 of the shaft 100 engages the pattern control arm 88. In its normal position, and not engaged with the arm 88 the shaft 100 is in the position shown in Figure 6, and in moving from the position shown in Figure 7 to the position shown in Figure 6 the cam shaped surface 120 at the inner end of the yarn guide finger or member 110 engages a portion 121 of the standard 101 and moves the guide finger 110 downwardly, against normal action of its spring 114, and responsive to the greater force of the spring 103, and in this position the finger 110 will normally feed the yarn 53 into the fabric, as above described.

Figure 1:
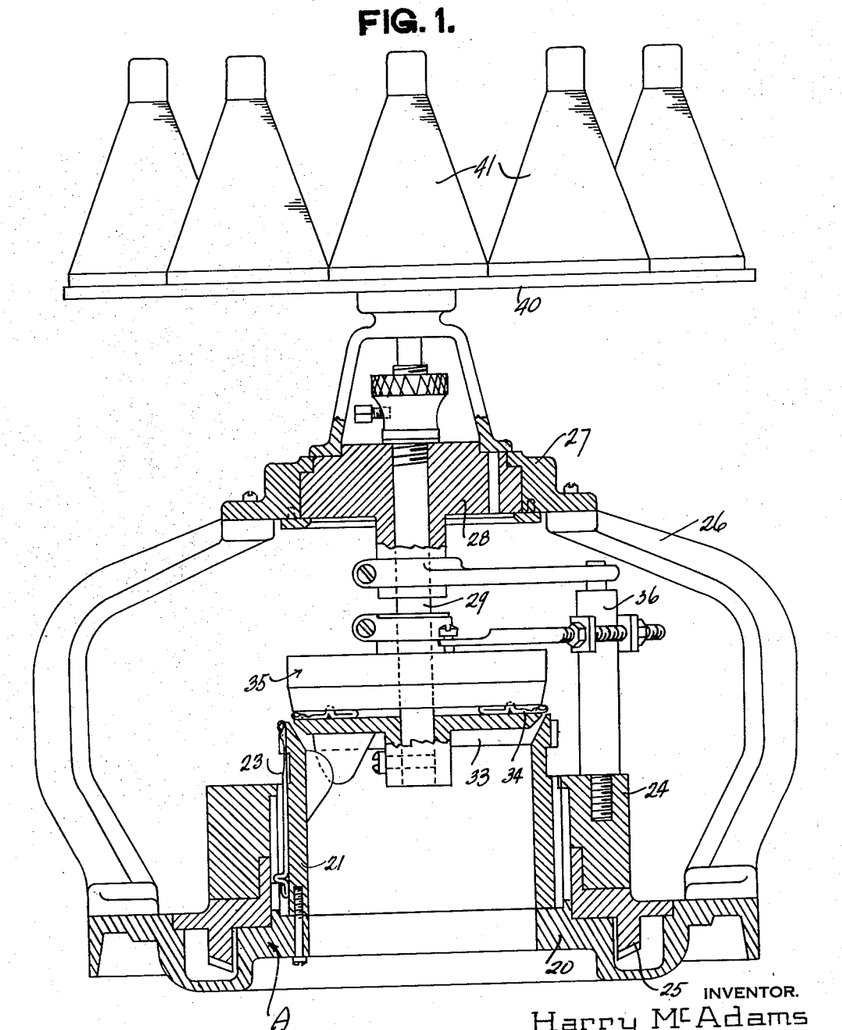
Figure 1 is a vertical sectional view taken through a knitting machine whereon the elastic tops for the improved stocking are continuously knitted in string-work; the machine being generally of the type manufactured by the Wildman Manufacturing Company and conforming in many respects to the mechanism such as shown in U. S. Patents 805,612; 1,012,966, and 1,253,563.

As above mentioned the conventional Wildman machine is provided with pattern control mechanism beneath the bed of the machine, somewhat of the nature shown in Figure 1 of U. S. Patent 805,612, which operates vertically slidable stems. One of such stems is shown at 130 in Figure 9 of the drawings; the same being mounted in the frame 20 of the machine and at its upper end having a suitable laterally extending pin 131 adapted to engage a lever arm 132 provided on one end of a rocker shaft 133; the latter being best shown in Figure 2 of the drawings. This rocker shaft 133 at its other end has a lever arm 134 adapted to operate against the pin 93 above described, for raising and lowering the device 72 for controlling the various yarns, in the manner above described.

It will readily be apparent from the foregoing that when the pattern control mechanism lifts the arm 88 and base 89 of the device 72 to the position shown in Figure 10 it will position the pins 81 and 82 in the path of the star wheel 67 for performing the operation above described, and at the same time it will position the arm 88 so that the cam segment 116 on the end of the arm 100 of the device H will engage said arm and the plunger device will be thrown into position shown in Figure 7 of the drawings. Just before the star wheel 67 hits the pin 82 for throwing the yarn 53 out of feeding position relative to the dial needles the segment 116 will ride off the shoulder edge 140 of the arm 88 and the hook end 112 of the yarn finger 110 will then grab the yarn due to action of the spring 103 as above described, and thus lower the yarn into the position shown in Figure 6 for feed into the fabric being knitted, so that said yarn 53 will be laid in to form the upper elastic section of the fabric, designated at 145 in the drawings. The elastic yarn 53 is wrapped around the cylinder in the notch at the upper end thereof provided therefor and it is cast off during the knitting at feed E.

Figure 3:
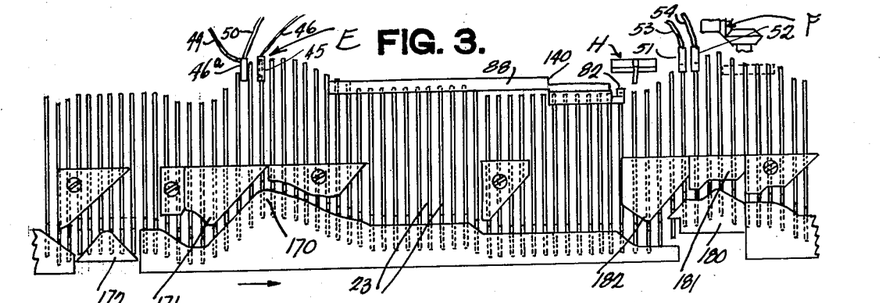
Figure 3 is a developed view of the cylinder needle set-up.

Referring to Figure 3 of the drawings wherein is shown the cam set-up for the cylinder needles, the two feeds E and F correspond to the same feeds shown in Figure 2 of the drawings. At the feed E the cylinder cam ring is provided with a cam 170 which elevates the cylinder needles to a point where it may receive yarns 46, 49 and 50, and a stitch cam 171 is provided at that point. Just rearwardly in the line of action of these cams a movable cam 172 is provided which moves to an up position, together with the movable stitch cam 171, at a location between the knitting of adjacent tops of the stocking, so that the yarn is fed below the latches for one or more courses to make a loose severing zone or section. Of course, these cams 171 and 172 and other movable cams on the cylinder cam ring are actuated by means of the pattern control disc or roller 73; the latter being elevated and lowered in the usual manner and engaging suitable rocker arms pivoted in the cylinder cam ring, as is conventional to the Wildman type of machine and shown in the above identified patent.

At feed F of the machine, in addition to other leveling cams, there are provided a pair of lower and upper cams 180 and 181 respectively, which operate in unison. They normally elevate the needles to take the yarns 53 and 54 at the feed F, but they are also moved downwardly during the knitting of one course to cause the needles to miss the yarns at the time that the dial needles are knitting the yarn 54 during the knitting of the French welt. At this feed F there is also provided a movable stitch cast-off cam 182. For purposes of this invention the rest of the cams shown in Figure 3 need not be described, since their use is well understood.

Figure 4:
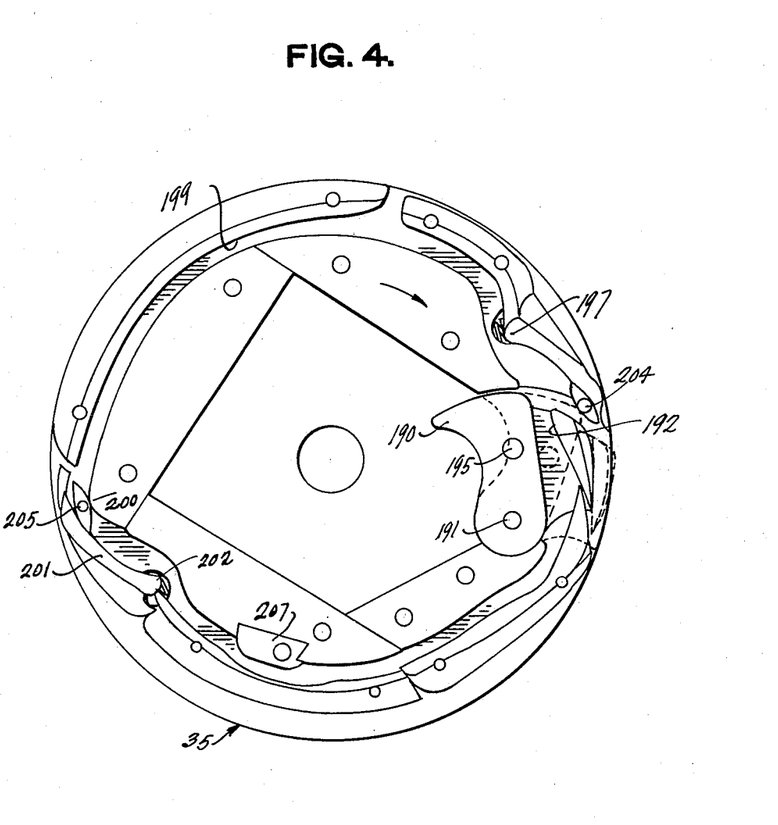
Figure 4 is a bottom plan view of the dial cap, showing more particularly the cam arrangement thereon.

In the dial cam carrier or cap, at the location corresponding to feed E there is provided a movable cam 190, pivoted at 191 which is provided with a dial needle butt passageway 192 to determine the retracted or projected position of the dial needles. This cam 190 at feed E, is controlled by means of a pivoted arm 193, shown in Figure 2 of the drawings, which through a link 194 is attached to a pin 195 on the cam 190 for throwing it on its pivot 191 to an "in" or "out" position. The needle retracting position is shown in full lines in Figure 4 of the drawings and the needle projecting position is shown in dotted lines in that position. The arm 193 is of course actuated by the pattern regulated disc 73 above described, which may be positioned at desired levels. The cam 190 is thrown to the dotted position for projecting the dial needles to take the yarn at E feed. This cam 190 is thrown out of action during knitting of the French welt at the time that the cylinder needles take yarn for knitting the outer web of the French welt. At feed E a stitch cam 197 is provided, as shown in Figure 4, for casting off the stitch after the needles have been projected to take new yarn. The dial needle butt groove 199 is shown in Figure 4 of the drawings. At feed F a needle projecting cam 200 projects the dial needles for receiving yarns, and a movable stitch cam 201 retracts the needles and casts off the stitches at point 202. It should be noted that both stitch cams 197 and 201 are pivoted at locations designated at 204 and 205 respectively in Figure 4 of the drawings. In the dial needle butt groove of the dial cap there is provided a cam 207 which throws the dial needles out for a slight distance so that the elastic yarn 53 will not jump up on top of the dial needles during the floating of the elastic yarn in the elastic section 145 of the stocking. This position is shown in Figure 6 of the drawings.

Referring again to that point in the knitting of the fabric after elastic yarn 53 has started to float into the knitted upper elastic section 145, it should be remembered that the hook 110 is holding the yarn 53 in position shown in Figure 6, and that this elastic yarn is wrapped around the shoulder at the top of the cylinder. The cylinder needles at feed E cast off the yarn 46, but the dial needles at this feed location E, and at this point in the knitting, are not retracted to cast off the yarn 46. The dial needles are then in only part way, and the stitches of the dial needles are subsequently cast off at feed F by the dial needle stitch cam 201 at that point. This leaves a rather peculiar stitch which is shown in the section 145 in Figure 15 of the drawings. It should also be noted that during the knitting of this section 145 the inelastic yarn 54 is also fed to the dial and cylinder needles, to produce double feed knitting in the section 145. This yarn 54 is cast off at feed F, both off of the dial and cylinder needles. By holding the yarn 46 on the dial needles after the cylinder needles have cast off that yarn at feed E and subsequently casting said yarn 46 off of the dial needles at the feed F, a looser stitch is provided in the upper elastic section 145, as will be noted from Figure 15. This permits the elastic section 145 to be laterally stretched. It is always desirable during the knitting of this elastic section 145 to lower the cylinder stitch drawing cams slightly more than regular, so as to stretch the stitches for looser knitting. This does not have to be done with the dial needle stitch drawing cams.

After the elastic band section 145 has been knitted it is desirable to go into regular rib knitting, using the inelastic yarns at both feeds E and F. Thus, the dial and cylinder needles at these feeds take the yarns 46 and 54 respectively, and they are cast off at their respective feeds to produce regular rib knitting in the section designated at 215 in Figure 15 of the drawings.

Below the rib knitted portion 215 of the stocking top C a second elastic section 216 is provided, which may be slightly less in length than the upper section 145, but which has not only a lateral stretch but a longitudinal stretch. This section is formed in a rather novel manner of two webs or plies, the outer web comprising the elastic ply. It is formed of an elastic yarn 50 and a fine inelastic yarn 49, both of which are fed from the same feed finger 46ᵃ. The inner web of this section 216 is formed of the inelastic yarn 54. The formation of this section 216 is accomplished as follows:

After knitting of the rib section 215 the body inelastic yarn 46 is inoperatively positioned. Yarns 54 and 46 are heavier than the inelastic yarn 49; the relation being that yarns 46 and 54 are conventionally known as "No. 36 yarns," and the finer inelastic yarn 49 is known as "No. 80 yarn." The inelastic yarn 49 and the elastic yarn 50 at feed E are now fed to only the cylinder needles, and at this feed E the dial needles are retracted. In the same courses of knitting the inelastic body yarn 54 is fed at the feed F to only the dial needles, and at this feed F the cylinder needles are retracted. This produces separate webs, somewhat similar to a French welt; with the outer ply formed of the elastic and inelastic yarns 50 and 49 respectively knitted together in stitch formation and both appearing in the same stitches to form the outer ply and the yarn 54 forming the inner ply. The dial needles during the knitting of this section 216 are moved to full retracting position so as to lengthen the stitches produced by the yarn 54. The elastic yarn at this section is knitted under tension. In Figure 14 the inner ply of this section is designated at 216ᵃ and the outer ply at 216ᵇ.

On the top C below the two-way stretch elastic section 216 there is knitted a loose rib section 250. The knitting of this gives a better appearance to the stocking after the top is attached thereto and enables a more comfortable adaptation of the stocking to the leg of the wearer, as will be noted from Figure 16 of the drawings. This loose rib section 250 is knitted with a double feed on the machine; both inelastic yarns 54 and 46 being used at the feeds E and F respectively. The inelastic yarn 46 has its stitches loosened by pulling down the stitch cam 171 and leaving the dial stitch cam 197 out of action, so that the stitches on the dial needles are not cast off until they reach the stitch cam 201 at feed F. The dial needle stitch cam 201 at feed F is not pushed in to give the stitch any extra length, nor is the cylinder needle stitch cam 182 at feed F lowered to give the stitch any extra length. Thus the stitch is only loosened at feed E for the yarn 46. This peculiarity in stitch construction will be noted at the section 250 in Figure 15 of the drawings. We then go into regular rib knitting and knit a short section 255, shown in Figure 15 of the drawings. The loose section shown in Figure 15 of the drawings is then knitted upon the dial needles, as above referred to.

The stocking tops C are transferred to a knitting machine, such as well known Banner machine or Scott and Williams machine, in the usual manner, well known to those skilled in the art to which this invention relates.

It is of course to be understood that modifications in the placement of elastic band sections in the top C may be made. It is the primary purpose of the invention to provide an elastic top which effectively holds the stocking in shape upon the wearer's leg, with a minimum of discomfort. It has been found, with many elastic tops now used in stockings sold on the market, that the elastic yarn is so placed on the top as to cause the stocking to slip down upon the leg of the wearer; thus defeating the primary purpose for which the elastic yarn is provided. While walking about, the upper garter section will not slip down on the wearer's leg, due to the fact that the lower garter section flexes longitudinally sufficiently to prevent the top of the stocking from working down upon the leg of the wearer. Also in some of the stockings now found on the market the elastic yarn is not placed in the stocking with due consideration to comfort. As will be noted with my improved elastic top it is placed on the stocking so that the upper elastic band section fits on the leg of the wearer above the calf, that is, above the thickened part of the leg of the wearer so that the stocking cannot slip down on the leg of the wearer, and the lower elastic section fits the leg of the wearer below where the calf is of greatest circumference and serves to laterally and longitudinally hold the stocking to the shape of the leg of the wearer.

The garter section provided with the inelastic ply is a considerable improvement over the prior garter section for stockings inasmuch as inelastic ply protects the leg of the wearer against welts forming on the wearer's leg due to contraction of the elastic yarns.

So far as modifications are concerned it is desirable to have the two elastic sections spaced appreciable distances apart, but they do not nessarily have to adapt themselves to the calf of the wearer's leg in the relation above mentioned. It is also possible to depart from the above detailed invention by providing a series of lower elastic sections. I have also produced an elastic stocking with the two-way stretch elastic section on the upper portion of the top of the stocking immediately below the upper elastic section which is directly at the top of the stocking top. I have also produced a stocking with an elastic section throughout the entire length of the top; the major portion of which is merely lateral stretch and a short band of which is of two-way stretch nature, similar to that above described for the preferred embodiment of the improved top. From this it can well be appreciated that various changes in the shape, size, and arrangement of parts may be made to the improved top, and that is also true of the parts of the machine and the process of knitting the stocking top, without departing from the spirit of the invention or the scope of the claims.

I claim:

1. As an article of manufacture a half hose provided with a leg portion and a top welt portion, the top welt portion near its juncture with the leg of the stocking having a short two-way stretch elastic garter section and said top welt at the upper end thereof having a short expansible elastic garter section with merely a circumferential stretch.

2. As an article of manufacture a stocking top for half hose and the like formed of rib knitted inelastic yarn and having two separated elastic garter yarn sections therein, one garter yarn section having the elastic yarn laid between the stitches of the inelastic yarn and the other garter section having the elastic yarn interknitted directly with the stitches of the inelastic yarn.

3. A knitted stocking the top of which is composed of a plurality of rib courses of inelastic thread and having incorporated therein a garter section formed of an elastic thread held between the rib and plain wales of the inelastic thread and knitted in at the ends thereof and under slight tension, and having incorporated therein at a different location another garter section formed of an elastic thread knitted in with the inelastic thread so as to produce a two-way stretch.

4. As an article of manufacture a stocking having a top portion adapted to fit upon the calf of a wearer's leg and being provided with a circumferentially restricting elastic section adapted to fit just above the bulge of the calf of the wearer's leg and another garter section below the upper garter section, the lower garter section having a stretch longitudinally of the stocking so as to flex on the wearer's leg during walking and prevent pulling of the upper garter section below the bulge of the wearer's leg.

5. As an article of manufacture a seamless knitted stocking having a seamless knitted top portion provided with one garter section which has an elastic circumferential stretch only and a lower garter section which has both a circumferential and a longitudinal elastic stretch.

6. As an article of manufacture a stocking provided with a knitted top having incorporated therein both an upper elastic garter section and a lower elastic garter section, the upper garter section including an elastic yarn providing only a circumferential stretch and the lower elastic garter section having elastic yarn incorporated therein so as to produce a two-way stretch both longitudinally and circumferentially of the top.

7. As an article of manufacture a stocking having a leg portion and a top portion, said portions being constructed so that the top portion will fit completely over the calf of a wearer's leg, said top portion having a circumferentially restricted elastic section for fitting above the bulge of the wearer's leg calf and a lower elastic restricting section for fitting the wearer's leg below the calf bulge and having both a longitudinal and a lateral stretch so that during walking the longitudinal stretch of the lower garter section becoming effective will prevent pulling of the upper garter section below the bulge of the calf of the wearer's leg.

8. As an article of manufacture a stocking including a leg and a knitted top portion constructed so as to fit completely over the bulge of the leg of a wearer, said stocking top having an upper circumferentially stretchable elastic section which will fit just above the bulge in the leg of a wearer and being provided also with another garter section spaced below the upper garter section and having a definite walewise flexing action to prevent pulling of the upper garter section below the bulge of the leg of the wearer, such as would be apt to occur during walking, running, etc.

9. As an article of manufacture a stocking including a leg portion and a top portion, the relation of said portions being such that the top portion will fit completely over and above the bulge in the calf of a wearer's leg, said top portion having an upper elastic section fitting above the maximum bulge of the wearer's calf and provided with merely a circumferential stretch, said stocking below the upper elastic section having a second elastic section provided with a walewise stretching action so as to prevent pulling of the upper elastic section below the maximum bulge of the wearer's leg calf such as would be apt to occur during walking, running, etc.

10. The method of knitting a stocking top which consists in rib knitting the top of inelastic yarn, incorporating with the inelastic yarn in the upper portion of the rib top an elastic yarn under tension to provide a circumferential stretching action, and incorporating in the rib top below said upper elastic section a second elastic yarn knitted as a web in French welt fashion with the inelastic yarn and on the outer surface of the rib top.

HARRY McADAMS.